United States Patent [19]

Sloan, Jr.

[11] 4,102,472
[45] Jul. 25, 1978

[54] O-RINGS FOR VEHICLE FUEL TANK FILLER NECK CAPS

[75] Inventor: Paul H. Sloan, Jr., Sturgis, Mich.

[73] Assignee: Stant Manufacturing Company, Inc., Connersville, Ind.

[21] Appl. No.: 798,981

[22] Filed: May 24, 1977

Related U.S. Application Data

[63] Continuation-in-part of Ser. No. 706,051, Jul. 16, 1976.

[51] Int. Cl.$^2$ .................. B65D 39/08; B65D 45/02
[52] U.S. Cl. ................................. 220/295; 220/301; 220/304; 277/165; 16/2; 220/DIG. 33; 285/111; 285/232
[58] Field of Search ............... 277/165, 206 R, 207 A, 277/208, 209, 231; 220/DIG. 32, DIG. 33, 295, 301, 302, 304; 16/2, 3; 285/110, 111, 231, 232, 345

[56] References Cited

U.S. PATENT DOCUMENTS

| 1,697,814 | 1/1929 | Forbes | 16/2 X |
|---|---|---|---|
| 2,271,777 | 2/1942 | Nathan | 285/110 X |
| 2,560,092 | 7/1951 | De La Mater | 16/2 X |
| 2,592,949 | 4/1952 | Philipson | 74/501 |
| 2,733,052 | 1/1956 | Luther | 220/301 X |
| 3,127,049 | 3/1964 | Welty et al. | 220/301 |
| 3,746,209 | 7/1973 | Urban et al. | 220/295 |

FOREIGN PATENT DOCUMENTS 2,262,968  7/1973  Fed. Rep. of Germany ... 277/206 R

Primary Examiner—Robert S. Ward, Jr.
Attorney, Agent, or Firm—Jenkins, Coffey & Hyland

[57] ABSTRACT

Resilient O-ring seals for caps for closing vehicle fuel tank filler necks, the fuel caps having shank portions extending into the necks. The radial width of the annular space between the inner wall of such a neck and the outer wall of the shank is less than the radial dimension of the O-ring. Each O-ring includes an annular, radially outwardly facing groove defined by an axially inner lip, an axially outer lip, and a connecting web portion. As the shank with the O-ring thereon moves axially into the neck, the axially inner surface of the inner lip contacts the neck and is urged axially outwardly in a wiping action causing bending of the O-ring such that its radially inner surface is resiliently urged radially and compressively to seal the annular space. In one embodiment, the inner surface of the outer lip contacts the neck as the shank and O-ring are projected further into the neck. The outer lip of the O-ring thereby axially compressively seals the space. In other embodiments, the outer surface of the inner lip and the inner surface of the outer lip include compression rings or beads. Axially outward deflection of the inner lip causes its compression ring to contact one of the walls defining the annular groove, creating an additional seal. In two of these "compression ring" embodiments, the outer lip compression ring cooperates with the inner lip compression ring to create the additional seal.

16 Claims, 12 Drawing Figures

O-RINGS FOR VEHICLE FUEL TANK FILLER NECK CAPS

This is a continuation-in-part of my copending United States Patent Application Ser. No. 706,051 filed July 16, 1976, titled "O-Ring", and assigned to the same assignee as the instant application.

This invention relates to sealing rings for sealing annular spaces between surfaces. The type of sealing ring to which this invention relates is commonly referred to as an "O-ring". More specifically, this invention relates to an improved type of O-ring having a C-shaped radial cross section in a plane extending throught the axis of the ring.

O-rings having non-circular radial cross sections in planes extending through their axes are known in the art. O-rings of this type are described in, for example, the following United States patents:

| Patent Number | Issue Date | Inventor |
| --- | --- | --- |
| 1,697,814 | January 1, 1929 | Forbes |
| 2,271,777 | February 3, 1942 | Nathan |
| 2,547,185 | April 3, 1951 | Von Bolhar |
| 2,729,478 | January 3, 1956 | Chambers, Jr. et al |
| 2,733,052 | January 31, 1956 | Luther |
| 2,746,778 | May 22, 1956 | Hurlburt et al |
| 2,882,073 | April 14, 1959 | James |
| 2,906,552 | September 29, 1959 | White |
| 3,015,510 | January 2, 1962 | Bates |
| 3,085,515 | April 16, 1963 | Workman |
| 3,052,476 | September 4, 1962 | Workman |
| 3,127,049 | March 31, 1964 | Welty et al |
| 3,347,556 | October 17, 1967 | Fleckenstein et al |
| 3,366,392 | January 30, 1968 | Kennel |
| 3,418,001 | December 24, 1968 | Rentschler et al |
| 3,490,232 | January 20, 1970 | Baldwin |
| 3,498,623 | March 3, 1970 | Rowe |
| 3,572,539 | March 30, 1971 | Wunderlich |
| 3,591,207 | July 6, 1971 | Fisher |
| 3,746,209 | July 17, 1973 | Urban et al |
| 3,854,761 | December 17, 1974 | David |
| 3,918,605 | November 11, 1975 | Butler |

The following foreign patent specifications also disclose such O-rings:

| British Patent | 926,789 |
| German Offenlegungsschrift | 2,262,968 |
| Netherlands Octrooiaanvrage | 6,710,603 |

When such O-rings are made of resilient materials, the O-rings collapse to fill, or partly to fill, annular spaces between parts so that the parts are sealed to one another.

It is a primary object of the present invention to provide improved resilient rings for sealing annular spaces between parts, and particularly to seal a gas cap to a filler neck.

According to the present invention, a resilient annular ring seals an annular space defined when a first, radially inner surface is projected axially into a second, radially outer surface. The radial width of the annular space is less than the radial dimension of the ring. The ring includes an annular, radially outwardly facing groove defined by an axially inner lip, an axially outer lip, and a connecting radially inner web portion. The inner and outer lips both include axially inner and outer surfaces. The web portion includes a radially inwardly facing surface and a radially outwardly facing surface. The groove is defined at least partly by the axially outer surface of the inner lip, the axially inner surface of the outer lip, and the radially outwardly facing surface of the web. As the O-ring is projected axially into the annular space, the axially inner surface of the axially inner lip contacts the second surface, causing an initial, or first, seal to be made. As the first surface and the O-ring are axially inserted further into the second surface, the axially inner surface of the inner lip begins to slide or wipe along the second surface. This wiping action causes a bending moment to develop in the inner lip and the axially inner portion of the web, with the inner lip moving axially outwardly and radially inwardly from its unstressed position.

The bending moment thus established creates tensile stress radially along the inner lip axially inner surface and compressive stress radially along the inner lip axially outer surface. The axially outward wiping movement of the inner lip resiliently urges the O-ring in a twisting or rolling motion such that a second seal is established between the first surface and the radially inner surface of the O-ring. The force of this second seal is in equilibrium with the force of the first seal.

As insertion of the first surface into the second continues, the applied forces to the axially inner lip create a second bending moment near the radially and axially inner extent of the O-ring, the rolling action causing the web radially inwardly facing surface to be urged radially outwardly at its axially inner extent. This second bending moment is caused by the tensile stress along the axially inner surface of the axially inner lip equalizing with tensile stress along the radially inwardly facing surface of the web, and compressive stress along the axially outer surface of the axially inner lip equalizing with compressive stress established on the radially outwardly facing surface of the web.

In one illustrative embodiment, the axially inner surface of the outer lip contacts the second surface. Tensile stress along the axially inner surface of the outer lip, and compressive stress along the axially outer surface of the outer lip establish a third bending moment urging the outer lip axially outwardly. The last-mentioned tensile stress reduces the compressive stress along the web radially outer surface, which reduction pulls the web radially outer surface radially outwardly at its junction with the axially outer lip. When the O-ring has reached full installation depth, the axially inner surface of the axially outer lip creates a direct compressive seal between the lip of the filler neck and an axially inwardly facing surface of the cap.

In two illustrative embodiments of the instant invention, the axially outer surface of the inner lip includes a first annular compression ring. The first compression ring includes an axially outwardly facing top surface and an axially outwardly and radially inwardly extending inclined surface. The inclined surface in the illustrated embodiments is inclined at approximately 45° to the top surface of the first compression ring. When the first surface and O-ring are inserted fully into the second surface, the first compression ring contacts a wall of the groove. A fourth seal is thereby created.

Further, in two illustrative embodiments, a second, annular compression ring is defined on the axially inwardly facing surface of the outer lip. The second compression ring includes an axially inwardly facing bottom surface and a radially and axially inwardly facing inclined surface. The inclined surface makes an approximately 45° angle with the bottom surface of the second compression ring.

In two illustrative embodiments, the annular groove is defined in part by the radially outer surface of a straight web. The web extends between and connects the radially inner extents of the axially inner and outer lips. The web also includes a straight, radially inner surface which lies against the first surface. Establishment of the second bending moment causes the web to be deflected radially outwardly at its axially inner extent and to be urged radially inwardly at its axially outer extent against the first surface.

In a third illustrative embodiment, the web has curved radially inner and outer walls that are formed continuously with the walls of the axially inner and outer lips.

Additional objects of the present invention will become apparent to those skilled in the art to which the invention pertains by referring to the following descriptions of preferred embodiments and the accompanying drawings which illustrate the invention.

Figure 1:
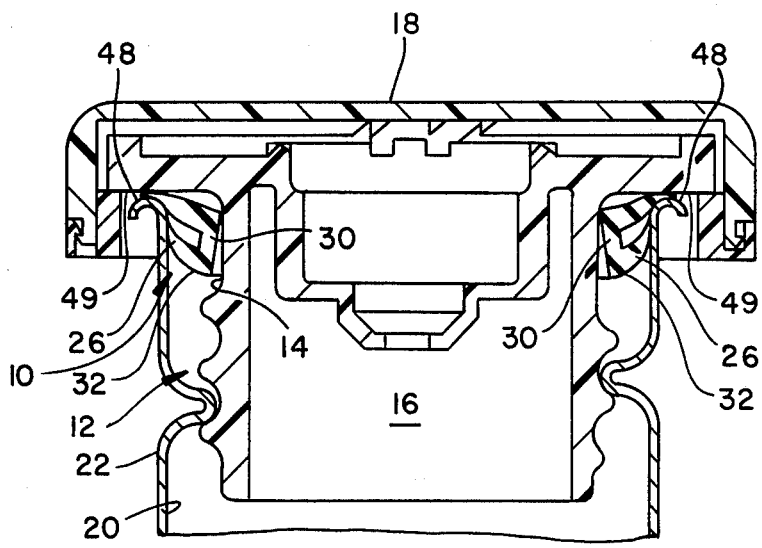
FIG. 1 is a cross sectional view of a vehicle fuel cap equipped with a sealing ring according to one embodiment of the instant invention, engaging a vehicle fuel filler neck.

Referring to FIG. 1, the annular sealing ring 10 seals an annular space 12 between a first radially inner surface 14, e.g., a radially outer surface of a combination closure member and pressure-vacuum vent valve housing 16 of a fuel filler neck cap 18, and a second, radially outer surface 20, e.g., the radially inner surface of a fuel filler neck 22.

Figure 2:
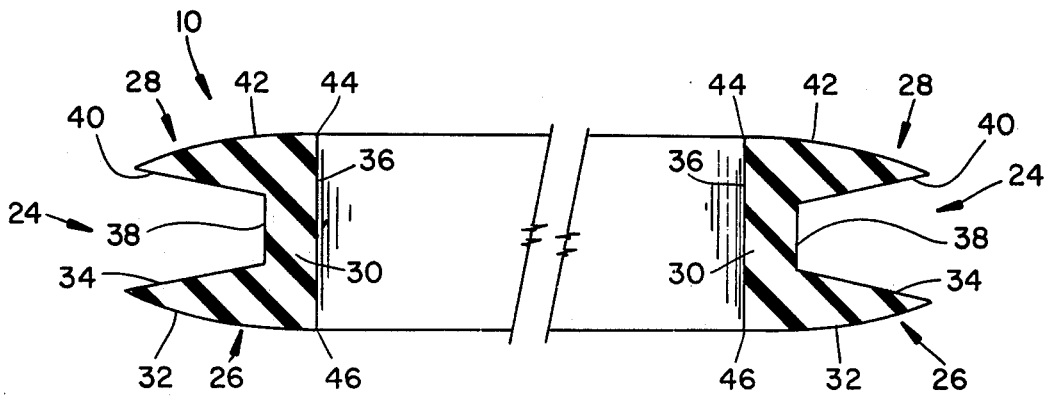
FIG. 2 is a fragmentary radial cross sectional view of the sealing ring of FIG. 1, taken through the plane of the axis of the sealing ring.

Referring to FIG. 2, ring 10 has an annular, radially outwardly opening groove 24. Ring 10 further includes an axially inner lip 26, an axially outer lip 28 and a connecting radially inner web portion 30. Inner lip 26 includes an axially inner surface 32 and an axially outer surface 34. Web 30 includes a radially inwardly facing surface 36 and a radially outwardly facing surface 38. Outer lip 28 includes an axially inner surface 40 and an axially outer surface 42.

Annular, radially outwardly opening groove 24 is defined by surfaces 34, 38, and 40. The web radially inner surface 36 includes an axially outer extent, or edge, 44 and an axially inner extent, or edge 46.

Referring again to FIG. 1, ring 10 is disposed about the radially outer surface 14 of valve housing 16 of fuel cap 18. As cap 18 is projected axially inwardly into fuel filler neck 22, axially inner surface 32 contacts the lip 48 at the axially outer end of filler neck 22. This contact establishes a first seal between surfaces 14, 20. Continued insertion causes a sliding or wiping movement between surfaces 20, 32.

Contact with lip 48 causes a first bending moment to develop which urges the sealing ring inner lip 26 axially outwardly and radially inwardly. The first bending moment creates tensile stress along surface 32 and compressive stress along surface 34. A force is established between surfaces 14 and 44. This force is in equilibrium with a force established between surfaces 20, 32.

As axial insertion continues, a second bending moment develops along edge 46, with a resulting twisting or rolling of ring 10 which causes the axially inner edge 46 of inner surface 36 to be urged radially outwardly. This second bending moment is accompanied by tensile stress along surface 32 which equalizes the tensile stress along surface 36. Compressive stress develops along surface 34 which equalizes the compressive stress along surface 38. The axially outer edge 44 of surface 36 is urged against surface 14 of valve housing 16. Resilient bending at edge 46 allows the sealing forces exerted by the axially inner surface 32 of inner lip 26 on the filler neck lip 48 and the force exerted by edge 44 on surface 14 to reach equilibrium. At equilibrium, a radial seal is established in annular space 12.

Axially inner surface 40 of outer lip 28 also contacts lip 48 of filler neck 22 when cap 18 is projected axially into filler neck 22. This establishes a bending moment on lip 28. Tensile stress is established on surface 40 and compressive stress on surface 42. The tensile stress on surface 40 reduces the compressive stress on surface 38. The compressive stress on surface 42 reduces the tensile stress along surface 36. This reinforces the twisting or rolling of the web radially outwardly at its axially inner extent and increases the force exerted by the axially outer edge 44 of surface 36 against surface 14. Equilibrium is maintained between the force exerted upon surface 20 of the neck 22 by surface 40 and a component of the force exerted upon surface 14 of valve housing 16 by edge 44. This equilibrium provides a direct, compressive, static, axial seal between surfaces 14, 20.

Figure 3:
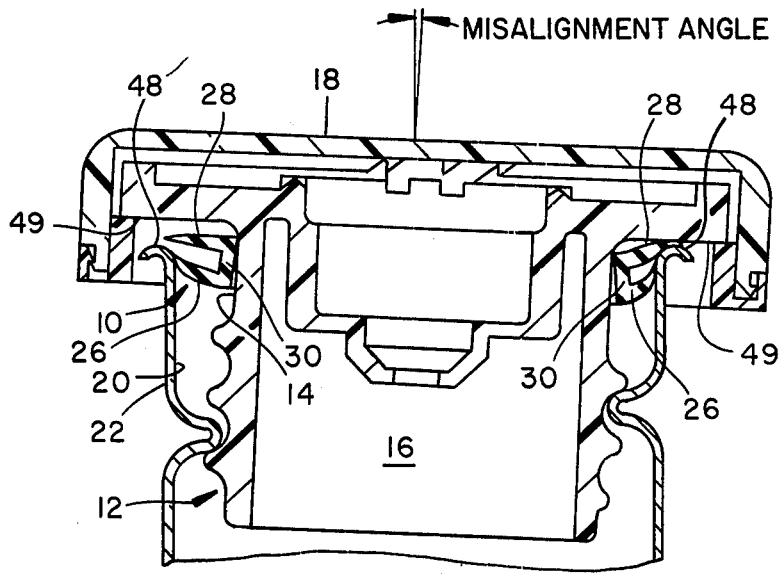
FIG. 3 shows the vehicle fuel cap of FIG. 1, with the sealing ring of FIGS. 1-2, misaligned in a fuel tank filler neck to show the tendency of the sealing ring to return the fuel cap to a proper orientation.

The annular ring 10 is capable of withstanding axial and radial misaligning movement under static or dynamic loading to prevent the seal created thereby in the annular space 12 from breaking. Relative movement of surfaces 14 and 20 selectively decreases and increases the radial and/or axial compressive forces exerted between such surfaces. Such selective variation tends to realign the cap in the filler neck. The tendency of the sealing ring to bring the fuel cap back into proper alignment of the fuel filler neck can best be understood by referring to FIG. 3. In FIG. 3, a misaligned condition of the cap on the neck is illustrated. Such misalignment can occur during a collision, for example. The increase in axial and/or radial compression of the right-hand portion of the ring 10 in FIG. 3 is accompanied by a corresponding decrease in the compression of ring 10 on the left-hand side. Since ring 10 is structurally symmetrical about its axis, the added compression on the right-hand side exerts a restoring force between the axially inwardly facing surface 49 of cap 18 surrounding housing 16, and the lip 48 of filler neck 22. This restoring force tends to equalize the force exerted upon surfaces 48, 49 by ring 10 about the entire periphery of the cap 18 and neck 22.

Ring 10 can be constructed of any suitable resilient material which is sufficiently chemically resistant to avoid reaction with the environments which it seals. Illustratively, a ring 10 for sealing an automobile fuel filler neck cap to enclose the gasoline vapor environment within the fuel filler neck can be constructed of urethane rubber. One such sealing ring 10 was made with an outside diameter of 2 inches and an inside diameter of 1.58 inches. The thickness of web 30 was 0.06 inch. The axial thickness of the ring 10 (axial length of wall 36) was 0.250 inch. The axial thickness of each of lips 26, 28 where it joins web 30 was approximately 0.08 inch.

Figure 4:
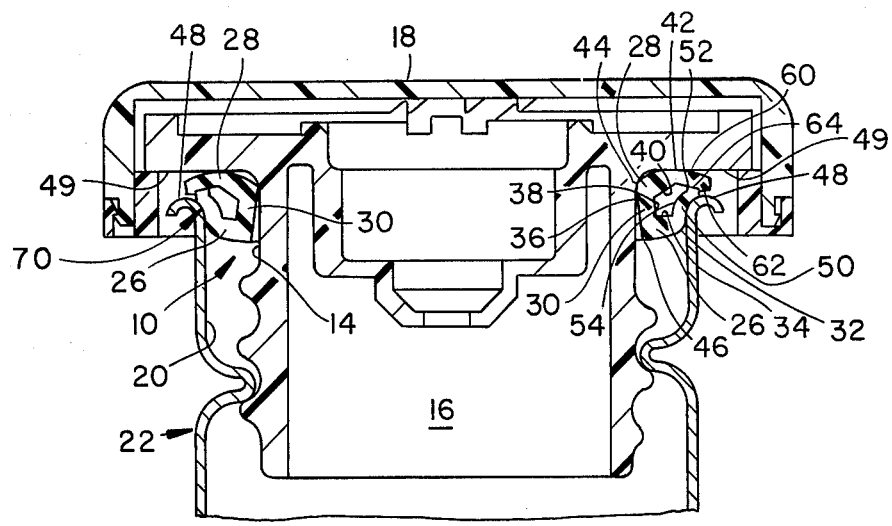
FIG. 4 is a cross sectional view of a vehicle fuel cap equipped with a sealing ring according to one embodiment of the instant invention, engaging a vehicle fuel filler neck.
Figure 5:
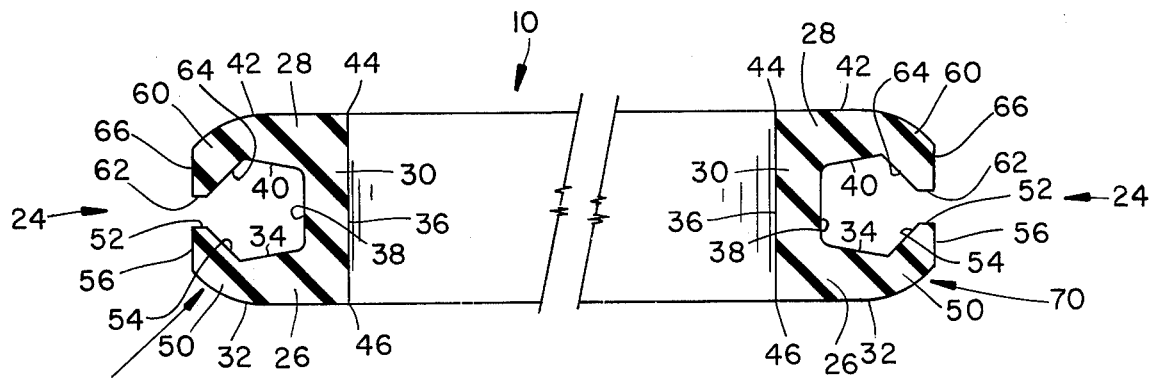
FIG. 5 is a fragmentary radial cross sectional view of the sealing ring of FIG. 4, taken through the plane of the axis of the sealing ring.
Figure 6:
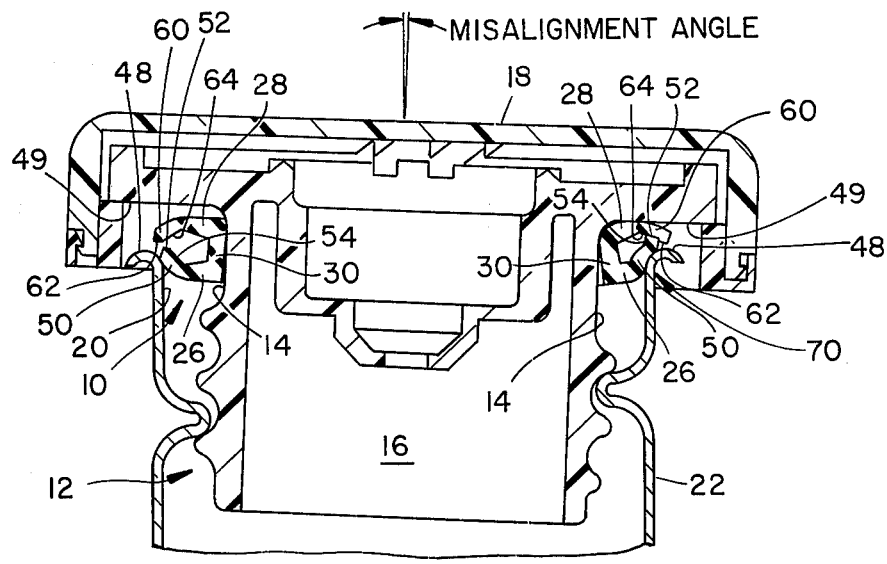
FIG. 6 shows the vehicle fuel cap of FIG. 4, with the sealing ring of FIGS. 4-5, misaligned in a fuel tank filler neck to show the tendency of the sealing ring to return the fuel cap to a proper orientation.

A second embodiment of the O-ring is illustrated in FIGS. 4-6. In this embodiment, those elements numbered similarly or identically to elements in the embodiment of FIGS. 1-3 perform the same or similar functions.

Referring now to FIGS. 4-6, the axially outer surface 34 of inner lip 26 is provided with a compression ring or bead 50. Compression ring 50 includes an axially outwardly facing top surface 52 and an axially outwardly and radially inwardly extending surface 54 which faces the interior of groove 24. Surface 54 is inclined at approximately 45° to surface 52. A radially outwardly facing surface 56 extends between the periphery of surface 52 and axially inner surface 32 of inner lip 26. Surface 34 of inner lip 26 inclines at an angle of 10° with respect to horizontal.

An upper compression ring 60 is provided on the axially inwardly facing surface 40 of lip 28. Ring 60 includes an axially inwardly facing bottom surface 62 and a radially and axially inwardly facing surface 64. Surface 64 makes an approximately 45° angle with surface 62 in the illustrated embodiment. A radially outwardly facing surface 66 extends between the periphery of surface 62 and the axially outer surface 42 of outer lip 28. Surface 40 inclines at an angle of 10° with respect to horizontal.

The O-ring of FIGS. 4-6 is designed to behave somewhat differently under compression than the ring of FIGS. 1-3. In the embodiment of FIGS. 4-6, the axially inner lip undergoes a "double-bending" to seal the annular space 12 radially. Under normal operating conditions, best illustrated in FIG. 4, surface 62 of compression ring 60 does not come into contact with the lip 48 of filler neck 22. Only when misalignment of the cap 18 on neck 22 occurs (FIG. 6) is compression ring 60 pinched between lip 48 and surface 49 to urge cap 18 into its normal orientation (FIG. 4).

Ordinarily, when the axially inner surface 32 of inner lip 26 first contacts lip 48, a bending moment is established in lip 26. Lip 26 is deflected axially outwardly and radially inwardly, as in the preceding embodiments, as movement of surface 14 axially into surface 20 continues.

Axially outward deflection of lip 26 continues until surface 52 of compression ring 50 lies against axially inner surface 40 of outer lip 28 adjacent surface 64 of compression ring 60. At this time, surface 56 of ring 50 lies against surface 64 of ring 60. Further projection of surface 14 axially into surface 20 results in compression of ring 50 against outer lip 28 and establishment of a recurve-, reverse- or double-bending moment in the region of arrow 70 of ring 10 in FIGS. 4-6. Such double-bending near the radially outer extent of inner lip 26 results as lip 26 is compressed about the contour of filler neck lip 48. The compressive forces exerted upon the material of lip 26 in the region of ring 50 are in equilibrium with compressive forces on the material in lip 28 in the region adjacent and radially inwardly from compression ring 60. Both of these regions are pinched between lip 48 of filler neck 22 and surface 49 of cap 18.

The following are illustrative dimensions for an O-ring seal 10 of the type illustrated in FIGS. 4-6: surface 36 axial length, 0.250 inch; surface 38 axial length, (approximately) 0.09 inch; web 30 radial thickness, 0.120 inch; lips 26, 28 axial dimension from surface 38, 0.15 inch; axial distance from surface 52 to surface 62, 0.04 inch; minimum axial distance from surface 32 to surface 42, 0.16 inch; axial length of surface 56 and surface 66, 0.06 inch; radial length of surface 52 or surface 62, 0.02 inch; outside diameter of ring 10, 2.125 inches; and, inside diameter of ring 10, 1.58 inches.

Figure 7:
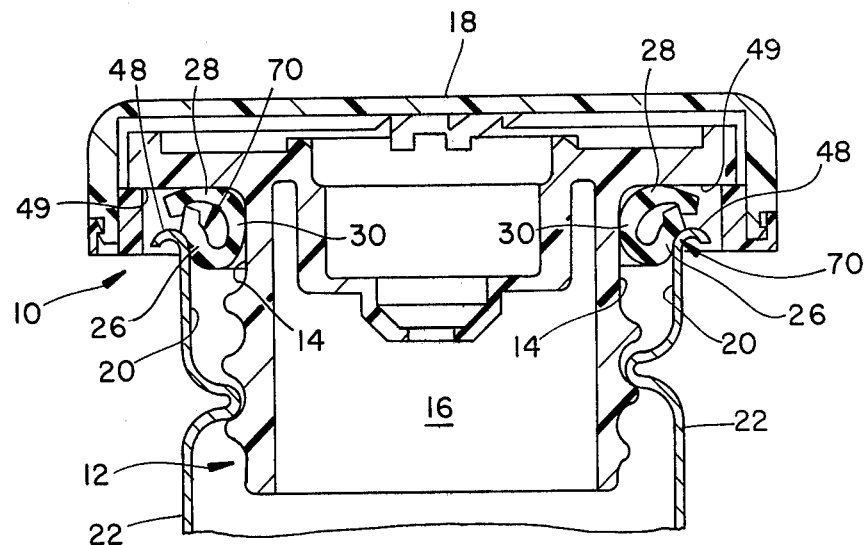
FIG. 7 is a cross sectional view of a vehicle fuel cap equipped with a sealing ring according to one embodiment of the instant invention, engaging a vehicle fuel filler neck.
Figure 8:
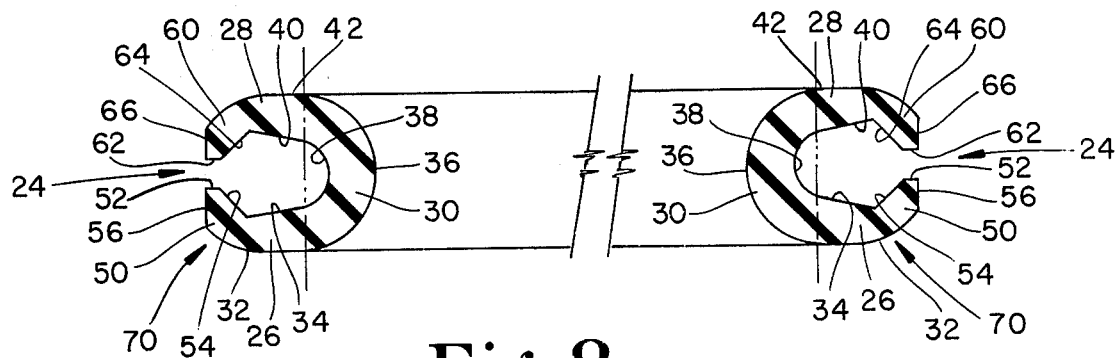
FIG. 8 is a fragmentary radial cross sectional view of the sealing ring of FIG. 7, taken through the plane of the axis of the sealing ring.

Referring to FIG. 8, the ring 10 of the third embodiment includes an annular, radially outwardly opening groove 24, an axially inner lip 26, and an axially outer lip 28 connected by a web portion 30. The radially inwardly facing surface 36 and radially outwardly facing surface 38 of web portion 30 are both curved to form continuous contours between the surfaces of lips 26, 28. That is, surface 38 smoothly and continuously joins the axially inner surface 40 of lip 28 and the axially outer surface 34 of lip 26. Web surface 36 smoothly and continuously joins axially inner surface 32 of lip 26 with axially outer surface 42 of lip 28. Thus, in the illustrative embodiment of FIGS. 7-9, there are no well defined edges or breaks between surfaces 34, 38, 40 or between surfaces 32, 36 42.

In this embodiment, as in the embodiment of FIGS. 4-6, axially outer surface 34 of lip 26 is provided with a compression ring 50. Compression ring 50 includes axially outwardly facing surface 52 and axially outwardly and radially inwarding facing surface 54. Again, such 54 is illustratively inclined at approximately 45° to surface 52. Peripherally and axially extending surface 56 extends between the peripherally outer extent of surface 52 and the axially outward curvature of surface 32.

Compression ring 60 is provided on the axially inwardly facing surface 40 of lip 28. Ring 60 includes axially inwardly facing surface 62 and radially and axially inwardly facing surface 64. Surface 64 illustratively makes an approximately 45° angle with surface 62. Peripherally and axially extending surface 66 extends between the peripherally outer extent of surface 62 and the axially inward curvature of surface 42.

Figure 9:
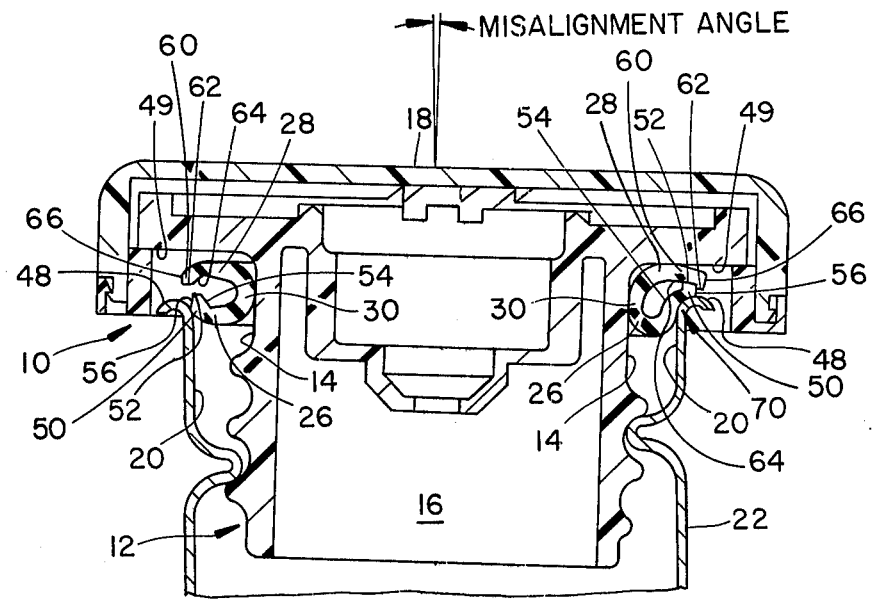
FIG. 9 shows the vehicle fuel cap of FIG. 7, with the sealing ring of FIGS. 7-8 misaligned in a fuel tank filler neck to show the tendency of the sealing ring to return the fuel cap to a proper orientation.

The O-ring of FIGS. 7-9 is designed to behave in generally the same manner as the ring of FIGS. 4-6.

The axially inner undergoes double-bending to seal the annular space 12 radially. Under normal operating conditions, best illustrated in FIG. 7, surface 62 of compression ring 60 does not come into contact with the lip 48 of filler neck 22. Only when misalignment of the cap 18 on neck 22 occurs (FIG. 9) is compression ring 60 pinched between lip 48 and surface 49 to urge cap 18 into its normal orientation (FIG. 7).

Ordinarilly, when the axially inner surface 32 of inner lip 26 first contacts lip 48, a bending moment is established in lip 26. Lip 26 is deflected axially outwardly and radially inwardly, as in the preceding embodiments, as movement of surface 14 axially into surface 20 continues.

Axially outward deflection of lip 26 continues until surface 52 of compression ring 50 lies against axially inner surface 40 of outer lip 28 adjacent surface 64 of compression ring 60. At this time, surface 56 of ring 50 lies against surface 64 of ring 60. Further projection of surface 14 axially into surface 20 results in compression of ring 50 against outer lip 28 and establishment of the double-bending moment in the region of arrow 70 of ring 10 in FIGS. 7-9. Such double-bending near the radially outer extent of inner lip 26 results as lip 26 is compressed about the contour of filler neck lip 48. The compressive forces exerted upon the material of lip 26 in the region of ring 50 are in equilibrium with compressive forces on the material in lip 28 in the region adjacent and radially inwardly from compression ring 60. Both of these regions are pinched between lip 48 of filler neck 22 and surface 49 of cap 18.

The following are illustrative dimensions for an O-ring seal 10 of the type illustrated in FIGS. 7-9: maximum axial dimension of ring 10, 0.225 inch; maximum axial dimension of groove 24, 0.185 inch; web 30 thickness between walls 36, 38, 0.1 inch (approximately uniform); maximum radial dimension of ring 10, 0.210 inch; axial distance from surface 34 to surface 52, and from surface 42 to surface 62, 0.07 inch; radial length of surface 52 and surface 62, 6.02 inch; outside diameter of ring 10, 2 inches; and, inside diameter of ring 10, 1.58 inches.

The sizes, shapes and materials of the illustrated O-rings are helpful to achieve the described sealing characteristics. The lips of the described O-rings are designed to maintain uniform fiber stress in both tension and compression. It is currently considered desirable that the lips taper from the web radially outwardly. This accounts for the radius of surface 32. This radius helps facilitate wiping action upon installation. This radius also helps insure the integrity of the seal on misalignment.

The web is designed to bend in the groove 24 region between inner and outer lips 26, 28. This helps to localize the sealing force exerted against surface 14 of housing 16, for example, in the embodiments of FIGS. 1-6, in the region of edge 44. This also helps to keep the region of lower lip 26 adjacent the radially outer extent of surface 32 out of contact with surface 20 of the filler neck, thereby preventing this region from "digging" into the side of the filler neck to impair the removal of the cap.

In the embodiments of FIGS. 4-9, the compression rings on the inner lip 26 solidly contact the surfaces of groove 24 to promote the dynamic seal of the annular space 12.

Groove 24 should be axially wide enough to allow lip 26 to flex axially outwardly and radially inwardly without interference from the outer lip 28. This allows the surfaces of compression ring 50 to move into contact with the surfaces of groove 24. In the embodiments of FIGS. 4-9, this means that the web axial length desirably is greater than the maximum radial dimension of the web and lip 26 combined.

In practice, it has been found that to accomplish this last objective, it is desirable to make the lip 26 radial dimension at least two-thirds of the web 30 axial dimension.

Figure 10:
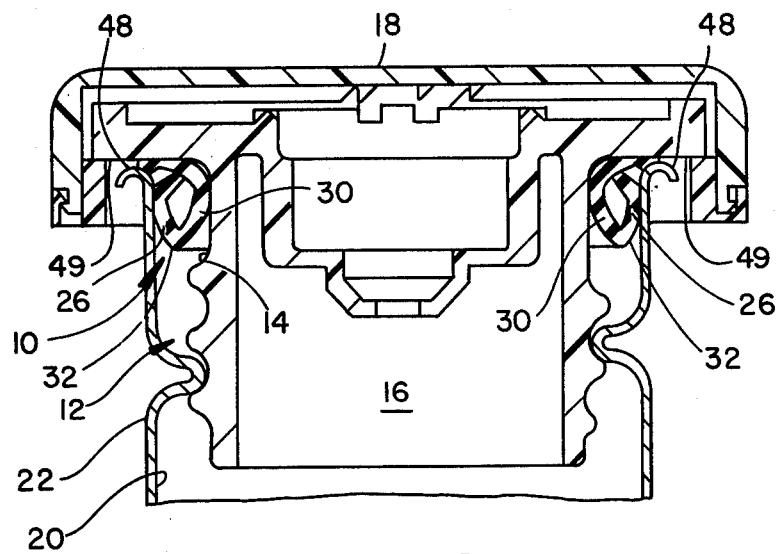
FIG. 10 is a cross sectional view of a vehicle fuel cap equipped with a sealing ring according to one embodiment of the instant invention, engaging a vehicle fuel filler neck.
Figure 11:
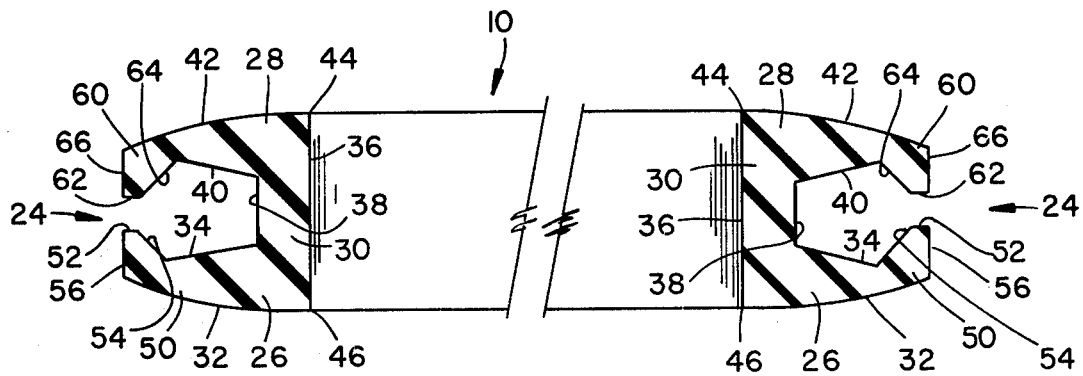
FIG. 11 is a fragmentary radial cross sectional view of the sealing ring of FIG. 10, taken through the plane of the axis of the sealing ring; and, FIG. 12 shows the vehicle fuel cap of FIG. 10, with the sealing ring of FIGS. 10-11 misaligned in a fuel tank filler neck to show the tendency of the sealing ring to return the fuel cap to a proper orientation.
Figure 12:
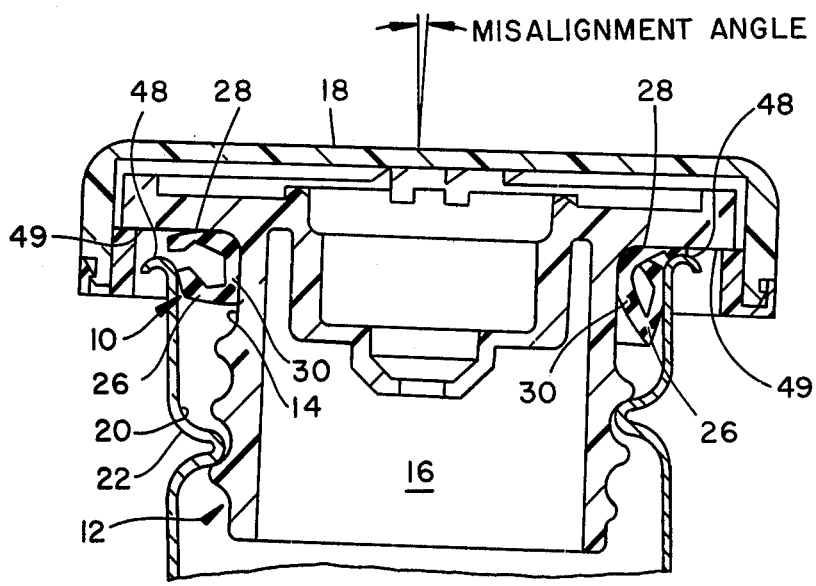

A fourth embodiment of the O-ring is illustrated in FIGS. 10-12. In this embodiment, those elements numbered similarly or identically to elements in the embodiments of FIGS. 1-9 perform the same or similar functions.

Referring now to FIGS. 10-12, the axially outer surface 34 of inner lip 26 is provided with a compression ring or bead 50. Compression ring 50 includes an axially outwardly facing top surface 52 and an axially outwardly and radially inwardly extending surface 54 which faces the interior of groove 24. Surface 54 is inclined at approximately 45° to surface 52. A radially outwardly facing surface 56 extends between the periphery of surface 52 and axially inner surface 32 of inner lip 26. Surface 34 of inner lip 26 inclines at an angle of 10° with respect to horizontal.

An upper compression ring 60 is provided on the axially inwardly facing surface 40 of lip 28. Ring 60 includes an axially inwardly facing bottom surface 62 and a radially and axially inwardly facing surface 64. Surface 64 makes an approximately 45° angle with surface 62 in the illustrated embodiment. A radially outwardly facing surface 66 extends between the periphery of surface 62 and the axially outer surface 42 of outer lip 28. Surface 40 inclines at an angle of 10° with respect to horizontal.

The O-ring of FIGS. 10-12 is designed to behave somewhat in the same manner under compression as the ring of FIGS. 1-3. In the embodiment of FIGS. 10-12, the axially inner lip bends in the same manner as in the embodiment of FIGS. 1-3 to seal the annular space 12 radially. Compression rings 50, 60 of this embodiment distinguish it from the embodiment of FIGS. 1-3.

Under normal operating conditions, best illustrated in FIG. 10, surface 62 of compression ring 60 comes into contact with the lip 48 of filler neck 22. Ordinarily, when the axially inner surface 32 of inner lip 26 first contacts lip 48, a bending moment is established in lip 26. Lip 26 is deflected axially outwardly and radially inwardly, as in the preceding embodiments, as movement of surface 14 axially into surface 20 continues.

Axially outward deflection of lip 26 continues until surface 52 of compression ring 50 lies against axially inner surface 40 of outer lip 28 adjacent surface 38 of web 30. At full projection of closure 16 into neck 22, compression ring 60 is compressed between surfaces 48, 49. Contact between surfaces 52, 40 establishes a solid seal (best illustrated in FIG. 10) between surface 14 of closure 16 and surface 20 of filler neck 22.

The following are illustrative dimensions for an O-ring seal 10 of the type illustrated in FIGS. 10-12: surface 36 axial length, 0.250 inch; surface 38 axial length, (approximately) 0.09 inch; web 30 radial thickness, 0.120 inch; lips 26, 28 axial dimension from surface 38, 0.15 inch; axial distance from surface 52 to surface 62, .04 inch; minimum axial distance from surface 32 to surface 42, 0.16 inch; axial length of surface 56 and surface 66, 0.06 inch; radial length of surface 52 or surface 62, 0.02 inch; outside diameter of ring 10, 2 inches; and, inside diameter of ring 10, 1.58 inches.

What is claimed is:

1. In combination, a cap for a fuel tank filler neck, the cap having a radially outwardly and peripherally extending, axially inwardly facing sealing flange surface and a generally cylindrical portion extending axially inwardly from said sealing surface for providing a first radially inner surface, the neck having an axially outwardly facing annular sealing lip and being generally cylindrical for providing a second radially outer surface, the first surface being axially projected into the second surface when the cap is placed in closing engagement on the neck defining between the first and second surfaces an annular space, and a resilient annular ring for sealing the annular space mounted on the first surface adjacent the sealing flange surface of the cap, the annular space having a radial width less than the radial width of the ring, the ring including peripherally and radially outwardly extending axially inner and axially outer lips and an axially extending web joining the inner and outer lips, the web being disposed adjacent the first surface, the inner and outer lips each including axially inner and outer surfaces and the web including a radially inner surface adjacent the first surface and a radially outer surface, the inner lip axially outer surface, the outer lip axially inner surface of the web radially outer surface defining a radially outwardly opening groove, the ring being formed for resilient axially outward wiping movement of the inner lip upon axial movement of the first surface into the second.

2. The invention of claim 1 wherein the axially outer surface of the inner lip includes means for providing a first annular compression ring which extends axially outwardly from the inner lip axially outer surface, resilient bending of the web and resilient axially outward wiping deflection of the inner lip providing sealing contact between the first compression ring and one of the groove-defining surfaces.

3. The invention of claim 2 wherein the axially inner surface of the outer lip includes an annular, radially and axially inwardly facing surface and the first annular compression ring includes a peripheral, radially outwardly extending surface, axially outward wiping movement of the inner lip causing the annular, radially and axially extending surface and the peripheral, radially outwardly facing surface of the first compression ring to move into abutting relationship.

4. The invention of claim 3 wherein the annular, radially and axially inwardly facing surface is provided on a second compression ring formed on the axially inner surface of the outer lip.

5. The invention of claim 3 wherein further axially inward movement of the first surface into the second after contact of the annular, radially and axially inwardly facing surface of the outer lip with the peripheral, radially outwardly facing surface of the first compression ring causes compression of the first compression ring and the region of the outer lip adjacent the annular, radially and axially inwardly facing surface, and reverse bending of the inner lip as the inner lip conforms to the shape of the lip of the neck.

6. The invention of claim 1 wherein the axially inner surface of the outer lip contacts the lip of the filler neck when the cap is in closing engagement with the filler neck.

7. The invention of claim 6 wherein, upon contact with the filler neck lip, the outer lip is resiliently deflected axially outwardly.

8. The invention of claim 6 wherein the axially outer lip is resiliently pinched between the neck lip and the axially inwardly facing sealing surface of the cap to provide a direct compression axial seal of the cap to the filler neck.

9. The invention of claim 1 wherein the axially inner surface of the inner lip is smoothly continuously contoured to prevent digging in of the sealing ring into the filler neck which hampers removal of the cap from the filler neck.

10. The invention of claim 1 wherein the axial dimension of the sealing ring is greater than the radial dimension of the sealing ring.

11. The invention of claim 1 wherein the axial dimension of the groove is greater than the radial dimension of the inner lip axially outer surface.

12. In combination, a gas cap, a filler neck, and an annular ring providing a seal between said cap and said neck, said ring having peripherally and radially outwardly extending axially inner and axially outer lips of a connecting web disposed about said cap, said axially outer lip being formed to have a peripherally and inwardly extending bead at its radially outer edge and said inner lip being formed to provide a peripherally and outwardly extending bead at its radially outer edge.

13. An O-ring seal for a fuel filler neck cap having a shank insertable into the filler neck and a peripherally and radially outwardly extending sealing flange at the outer end of the shank, said O-ring comprising an annular web portion disposed adjacent said shank, an axially inner lip for engaging said filler neck and an axially outer lip, said lips extending peripherally about and radially outwardly from said web portion.

14. The invention of claim 13 wherein the axially outer lip lies adjacent said flange.

15. The invention of claim 14 wherein the axially outer lip is pinched between said flange and the axially outer end of said filler neck when said cap is in closing engagement on said filler neck.

16. The invention of claim 13 in which said lips define a radially outwardly opening groove and the engagement of said inner lip with said neck resiliently urges said inner lip axially outwardly into said groove.

* * * * *

UNITED STATES PATENT OFFICE
CERTIFICATE OF CORRECTION

Patent No. 4,102,472　　　　　　　　　Dated July 25, 1978

Inventor(s) Paul H. Sloan, Jr.

It is certified that error appears in the above-identified patent and that said Letters Patent are hereby corrected as shown below:

Column 7, line 1, after "inner" insert -- lip --; same column, line 9, "Ordinarily" is misspelled; same column, line 40, "6.02 inch" should be -- 0.02 inch --.

Column 9, line 27 (Claim 1, line 24), "of" should be -- and --.

Column 10, line 16 (Claim 8, line 4), "compression" should be -- compressive --.

Signed and Sealed this

Twentieth Day of February 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,102,472          Dated   July 25, 1978

Inventor(s) Paul H. Sloan, Jr.

It is certified that error appears in the above-identified patent and that said Letters Patent are hereby corrected as shown below:

Column 10, line 32, "of" should be --and--.

Signed and Sealed this

Eighth Day of May 1979

[SEAL]

Attest:

RUTH C. MASON  
Attesting Officer

DONALD W. BANNER  
Commissioner of Patents and Trademarks